(12) United States Patent
Jung

(10) Patent No.: US 8,121,143 B2
(45) Date of Patent: Feb. 21, 2012

(54) SCHEDULING METHOD FOR BROADBAND WIRELESS ACCESS SYSTEM

(75) Inventor: Yong Jae Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 809 days.

(21) Appl. No.: 12/166,111

(22) Filed: Jul. 1, 2008

(65) Prior Publication Data

US 2009/0028104 A1     Jan. 29, 2009

(30) Foreign Application Priority Data

Jul. 24, 2007   (KR) .......................... 10-2007-0074196

(51) Int. Cl.
*H04L 12/42* (2006.01)
(52) U.S. Cl. ........................................ 370/444; 370/455
(58) Field of Classification Search .................. 370/203, 370/208, 329, 341, 349, 431, 436, 455, 464, 370/471, 473, 474, 444, 468, 458, 319, 321, 370/395.41, 395.42
See application file for complete search history.

(56) References Cited

U.S. PATENT DOCUMENTS

| | | | |
|---|---|---|---|
| 2006/0007849 A1 | 1/2006 | Kim et al. | |
| 2007/0060145 A1* | 3/2007 | Song et al. | 455/445 |
| 2007/0115880 A1 | 5/2007 | Huh et al. | |
| 2007/0206532 A1* | 9/2007 | Munzner | 370/329 |

FOREIGN PATENT DOCUMENTS

| | | |
|---|---|---|
| KR | 10-2006-0004870 A | 1/2006 |
| KR | 10-2006-0091158 A | 8/2006 |
| KR | 10-2007-0054065 A | 5/2007 |

* cited by examiner

*Primary Examiner* — Brenda H Pham
(74) *Attorney, Agent, or Firm* — Jefferson IP Law, LLP

(57) ABSTRACT

A scheduling method for a Broadband Wireless Access (BWA) system is provided. The scheduling method for a BWA system includes selecting a terminal having a highest priority using a scheduling algorithm, determining a burst region to be assigned to the terminal, and constructing a frame intended for the terminal according to the determination. The method improves network throughput and power conservation performance of subscriber stations.

7 Claims, 5 Drawing Sheets

US 8,121,143 B2

SCHEDULING METHOD FOR BROADBAND WIRELESS ACCESS SYSTEM

PRIORITY

This application claims the benefit under 35 U.S.C. §119 (a) of a Korean patent application filed in the Korean Intellectual Property Office on Jul. 24, 2007 and assigned Serial No. 2007-0074196, the entire disclosure of which is hereby incorporated by reference.

BACKGROUND OF THE INVENTION

1. Field of the Invention

The present invention relates to a Broadband Wireless Access (BWA) system. More particularly, the present invention relates to a scheduling method for a BWA system that is capable of improving network throughput and power conservation performance of subscriber stations.

2. Description of the Related Art

Recently, it has been considered desirable to integrate commercially available wireless networks such as Local Area Network (LAN) and Metropolitan Area Network (MAN) into a universal access platform, also known as the fourth generation (4G) communication system for securing mobility and Quality of Service (QoS) while maintaining relatively high data rates.

The Institute of Electrical and Electronics Engineers (IEEE) 802.16a and 802.16e Wireless MAN standards specify wireless metropolitan area networks adopting the Orthogonal Frequency Division Multiplexing (OFDM) and Orthogonal Frequency Division Multiple Access (OFDMA) for supporting broadband wireless transmission on physical channels.

Using the OFDM/OFDMA schemes in which signals are transmitted through a plurality of subcarriers, the IEEE 802.16a and 802.16e systems can achieve high speed data transmission. That is, the IEEE 802.16a and 802.16e systems are BWA systems based on the OFDM/OFDMA schemes.

FIG. 1 is a schematic diagram illustrating a conventional BWA communication system.

Referring to FIG. 1, a BWA system has a multi-cell structure, i.e. cells 100 and 150 defined by individual base stations 110 and 140 that provide access services to subscriber stations 111, 113, 130, 151 and 153. The base stations 110 and 140 provide access to the system for the subscriber stations 111, 113, 130, 151 and 153 on the basis of the OFDM/OFDM schemes.

In the OFDMA scheme, a subchannel includes a group of subcarriers constituting an OFDM symbol, and a frame includes multiple OFDM symbols.

FIG. 2 is a diagram illustrating a frame structure for use in a conventional BWA system. More particularly, FIG. 2 shows an OFDM frame structure of a BWA system operating in a Time Division Duplexing (TDD) mode.

As shown in FIG. 2, each frame includes a plurality of OFDMA symbols indicated by horizontal OFDMA symbol numbers and a plurality of subchannels indicated by vertical subchannel logical numbers. Also, each frame includes Downlink (DL) and Uplink (UL) subframes separated by Transmit/Receive and Receive/Transmit Transition (TTG and RTG, respectively) gaps.

Each DL subframe starts with a preamble followed by a Frame Control Header (FCH) and a DL-MAP that are commonly broadcast to all the subscriber stations.

The preamble contains information for acquiring the synchronization between a base station and subscriber stations, i.e., preamble sequence.

That is, the preamble is required for synchronization of data transmitted by the base station, whereby a modem of the subscriber station extracts synchronization information from the preamble in various manners.

The FCH, which includes two subchannels, contains basic information on the subchannel, ranging and modulation scheme. By analyzing the information carried by the FCH, each subscriber station can recognize a burst profile and length of the DL-MAP immediately following the FCH, and a frequency reuse factor of the base station typically set to 1 or 3.

The DL-MAP delivers a DL-MAP message carrying various information required for extracting data and providing services to the subscriber stations. The data can be extracted from the DL frame on the basis of the information contained in the DL-MAP message.

The downlink subframe includes multiple zones. Within each zone, transmission resources are allocated in bursts. For example, the zone composed of the $(k+3)^{th}$ to $(k+15)^{th}$ OFDM symbols is divided into 6 data bursts labeled DL burst #1 to DL burst #6. The data contained in each burst is extracted on the basis of the analysis of the DL-MAP.

The UL subframe includes one or more zones. Within each zone, transmission resources are allocated in respective bursts. The zone composed of $(k+17)^{th}$ to $(k+26)^{th}$ OFDM symbols is divided into 5 data bursts labeled UL burst #1 to UL burst #5 and a ranging region. The ranging region is composed of ranging subchannels for ranging and bandwidth request purposes. The uplink data are extracted from the UL bursts on the basis of the information acquired from the UL-MAP carried by the DL burst #1.

In an exemplary OFDM/OFDMA based communication system, a subchannel is a logical channel composed of multiple subcarriers, and the number of subcarriers constituting a subchannel depends on the system configuration. That is, the IEEE 802.16e OFDMA system allocates the resources in a form of a subchannel composed of a group of subcarriers in consideration of network status, to the subscriber stations.

In the meantime, the base station performs scheduling to efficiently assign the resources so as to maximize the network throughput and minimize the transmission delays of individual subscriber stations. For achieving these objectives, a scheduling algorithm should be designed in consideration of various factors such as the inter-sector interference, UL-MAP/DL-MAP overheads, expansion of cell coverage area, energy conservation of the subscriber stations, and stability of the links between the base station and subscriber stations, etc.

In the frame structure of FIG. 2, the DL-MAP contains DL-MAP Information Elements (IEs) to describe DL bursts corresponding to the subscriber stations. Accordingly, as the number of the subscriber stations increases, the size of the DL-MAP increases. Also, the increment of the number of the UL-MAP IEs causes the increase of the UL-MAP size. A large DL-MAP and UL-MAP results in a large amount of overhead by reducing the burst regions of the DL and UL subframes of each frame.

Since the DL and UL subframes are fixed in size, the increments of the DL-MAP and UL-MAP diminish the DL burst region of the frame, resulting in a reduction of a data rate per subscriber station and a reduction in a throughput of the entire network.

SUMMARY OF THE INVENTION

An aspect of the present invention is to address at least the above-mentioned problems and/or disadvantages and to provide at least the advantages described below. Accordingly, an aspect of the present invention is to provide a frame structure and scheduling method for a BWA system that is capable of reducing power consumption of subscriber stations.

Another aspect of the present invention is to provide a scheduling method for a BWA system that is capable of improving network throughput by reducing overhead of a DL-MAP and UL-MAP of a frame.

Still, another aspect of the present invention is to provide a scheduling method for a BWA system that is capable of reducing power consumption of subscriber stations by adjusting a number of the subscriber stations associated with a base station.

In accordance with an exemplary embodiment of the preset invention, a scheduling method for a broadband wireless access system is provided. The method includes selecting a terminal having a highest priority using a scheduling algorithm, determining a burst region to be assigned to the terminal, and constructing a frame intended for the terminal according to the determination.

In accordance with another exemplary embodiment of the present invention, a scheduling method for a broadband wireless access system is provided. The method includes distinguishing, at a base station, between subscriber terminals that are to receive data and subscriber terminals that are to transmit data, determining priorities of the subscriber terminals, constructing an UL MAP and a DL MAP by adding information of the subscriber terminals in an order of the priorities, and allocating bursts of the subscriber terminals in a single frame with reference to the UL and DL MAPs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description in conjunction with the accompanying drawings, in which.

The same reference numerals are used to represent the same elements throughout the drawings.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and phrases used in the specification and appended claims are provided to enable a clear and consistent understanding of the detailed description and the claims. Unless otherwise noted, the terms and phrases are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims.

An exemplary scheduling method for a BWA system according to the present invention improves the system performance and allows the subscriber stations to reduce energy consumption.

Network throughput and energy consumption are key issues in designing a mobile communication network. Typically, the base station and subscriber stations exchange overhead control data with each other in addition to user data, thereby reducing the throughput of the entire network.

In the present invention, a scheduling method that can reduce the MAP overhead of the BWA frame is proposed. This scheduling method improves the throughput of the entire network and conserves energy of the subscriber stations.

In the following exemplary embodiments, the BWA communication system is defined with a newly designed frame structure and scheduling method based on the frame structure. More particularly, the scheduling method is implemented with efficient structures of the DL-MAP and UL-MAP. The base station uses a Shortest Job First scheduling algorithm for constructing the MAPs.

In the following embodiments, a parameter indicating a number of continuous empty frames carrying no user data is added to the DL-MAP. Each subscriber station that receives the parameter recognizes the duration of the continuous empty data frames so as to efficiently control its transmission power on the basis of the parameter.

Although the scheduling method is described in association with the IEEE 802.16 communication system, the present invention is not limited thereto. For example, the scheduling method of the present invention can be applied to communication systems based on the OFDMA and TDD schemes.

Figure 1:
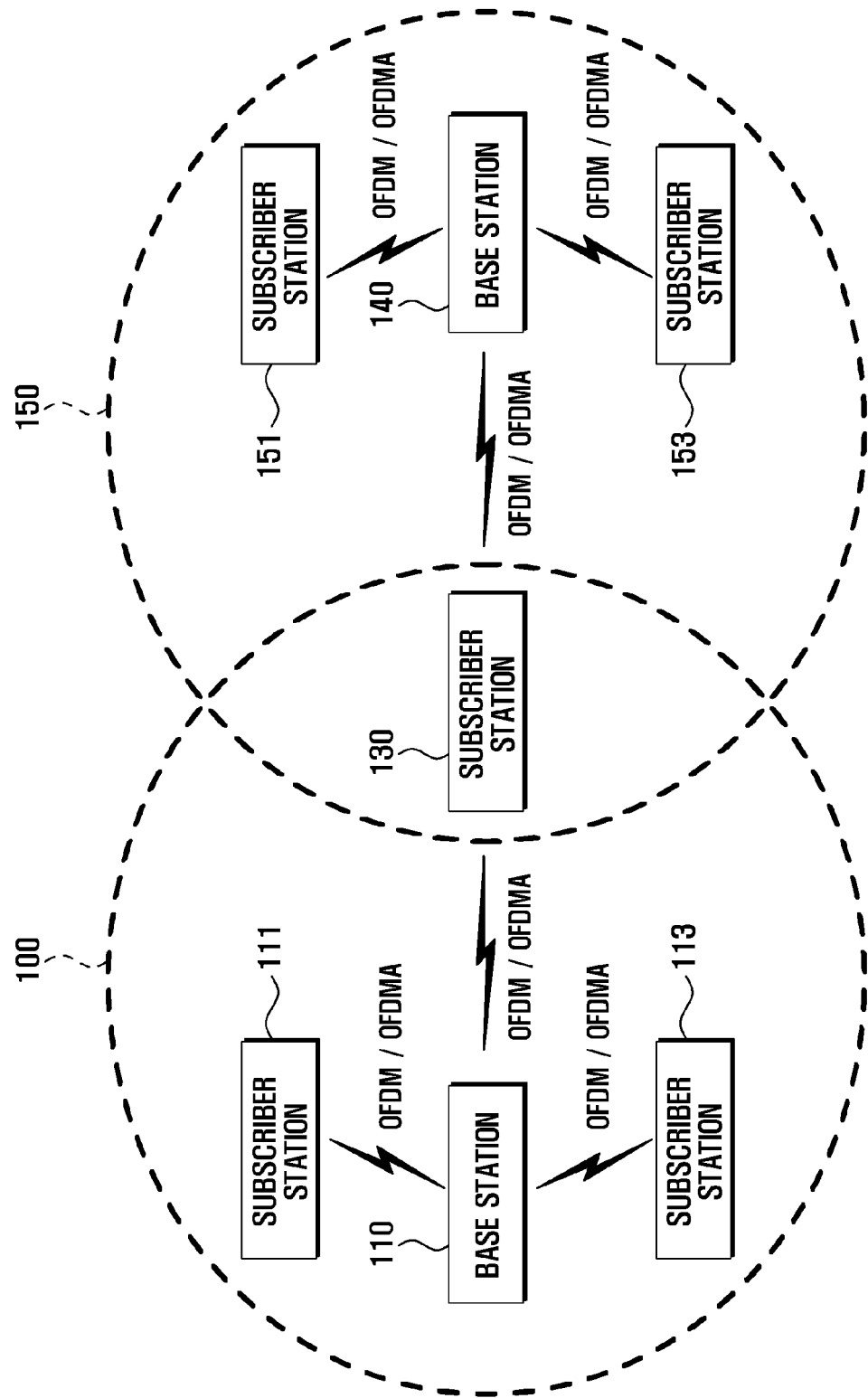
FIG. 1 is a schematic diagram illustrating a conventional BWA communication system.
Figure 2:
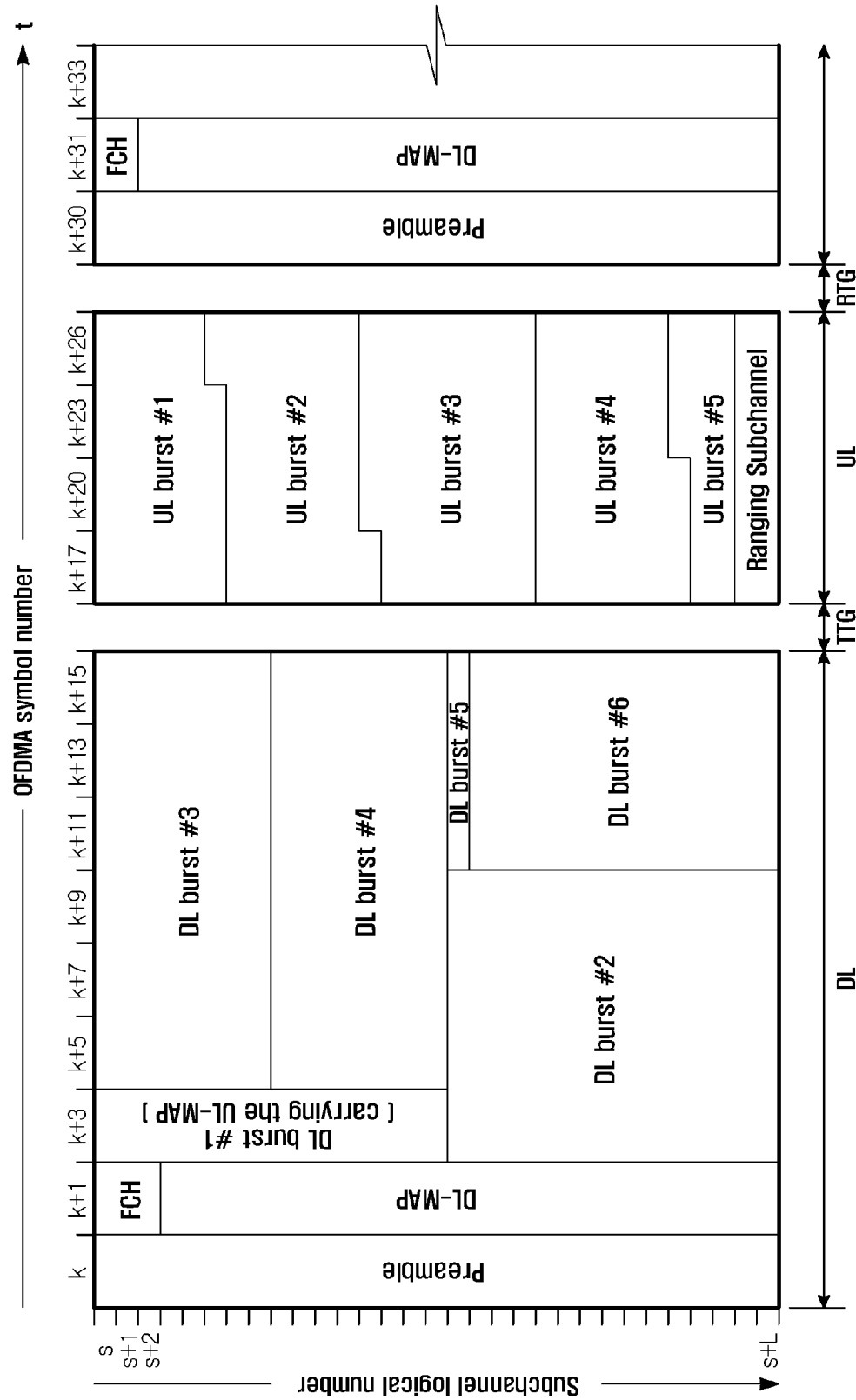
FIG. 2 is a diagram illustrating a frame structure for use in a conventional BWA system.
Figure 3:
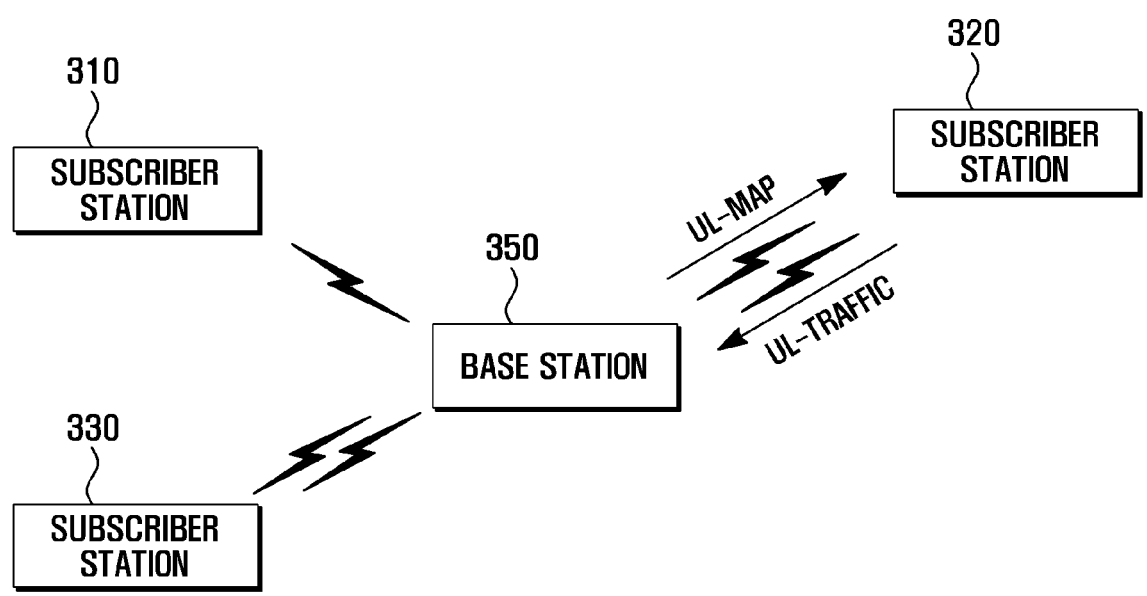
FIG. 3 is a schematic diagram illustrating a BWA system according to an exemplary embodiment of the present invention.

FIG. 3 is a schematic diagram illustrating a BWA system according to an exemplary embodiment of the present invention.

Referring to FIG. 3, the BWA system includes a base station 350 and a plurality of subscriber stations 310, 320 and 330 associated with the base station 350. The base station 350 allocates UL and DL resources for the subscriber stations 310, 320 and 330 located in its service coverage area and manages the traffic exchanged between the base station 350 and subscriber stations 310, 320 and 330.

The base station 350 first selects one of the subscriber stations 310, 320 and 330, e.g. the subscriber station 320, and composes a UL-MAP for the subscriber station 320.

In an exemplary embodiment, the UL-MAP is constructed by allocating resources in an order of priority (from the subscriber terminal requiring the least burst size to the one requiring the greatest burst size). The construction of the UL-MAP is described in greater detail below.

The base station 350 determines the amount of resources and Modulation and Coding Scheme (MCS) of each subscriber station. The base station 350 also determines the positions of the bursts of the respective subscriber stations 310, 320 and 330. The resource allocation is repeatedly performed until all of the subscriber stations are assigned appropriate resources.

After the uplink resource allocation is completed, the base station 350 broadcasts the UL-MAP message such that the subscriber stations 310, 320 and 330 recognize their uplink resource allocations with reference to the UL-MAP message. In an exemplary embodiment, the UL-MAP message may include information defining the number of continuous empty frames that are supposed to be transmitted by the subscriber station.

If the UL-MAP message is received, each subscriber station determines whether the UL-MAP message has uplink resource allocation information intended for itself. For example, if the UL-MAP message has the information on the resources assigned to the subscriber station 320, the subscriber station 320 transmits the user data using the resources indicated by the resource allocation information in the UL-MAP message.

Next, the base station 350 constructs a DL-MAP for transmitting the user data to the individual subscriber stations 310, 320, and 330.

The DL-MAP message is constructed by allocating resources in an order of priority (from the subscriber terminal requiring the least burst size to the one requiring the greatest burst size). The construction of the DL-MAP is described in greater detail below.

Next, the base station 350 determines the resource amounts and MCS levels to be assigned to respective subscriber stations. The base station 350 also determines the positions of the bursts to be transmitted to the respective subscriber stations. The resource allocation is repeatedly performed until all of the subscriber stations are assigned appropriate resources.

After the downlink resource allocation is completed, the base station 350 broadcasts the DL-MAP message in a cell message such that each of the subscriber stations 310, 320 and 330 recognizes its downlink resource allocations with reference to the DL-MAP message. In an exemplary embodiment, the DL-MAP message may include information defining the number of continuous empty frames to be transmitted to the respective subscriber stations.

If the DL-MAP message is received, each subscriber station determines whether the DL-MAP message has downlink resource allocation information intended for itself. For example, if the DL-MAP message has information on the resources assigned to the subscriber station 320, the subscriber station 320 receives the user data transmitted through the downlink resources indicated by the resource allocation information in the DL-MAP message.

As described above, the scheduling method for a BWA system according to an exemplary embodiment of the present invention is implemented with new structures for the downlink and uplink MAPs. The base station may use the Shortest Job First (SJF) scheduling algorithm for constructing efficient MAP structures. The SJF algorithm can be applied twice for scheduling the respective uplink and downlink bursts or one time for scheduling the uplink and downlink bursts at the initial stage. By scheduling the bursts with the SJF algorithm, each subscriber station can minimize the wait time taken for transmitting and receiving the data. That is, the SJF algorithm gives a minimum average wait time. Here, the entire wait time can be expressed as equation (1).

$$\sum_{k=1}^{n-1} Pk(n-k) = \sum_{k=1}^{n-1} Pkn - \sum_{k=1}^{n-1} Pkk = nPk - \sum_{k=1}^{n-1} Pkk, \quad (1)$$

where $$\sum_{k=1}^{n-1} Pk(n-k)$$

is the entire wait time, Pk is a data amount of the $k^{th}$ subscriber station, and n is a number of subscriber stations.

The SJF algorithm can efficiently arrange the MAPs and burst zones as well as minimizing the wait time of the subscriber station, thereby improving the throughput of the entire system.

In the exemplary BWA system of FIG. 3 in which the subscriber stations 310, 320 and 330 are associated with the base station 350, the base station 350 performs scheduling on the uplink and downlink bursts of the subscriber stations 310, 320 and 330.

Assuming that the base station 350 has one (1) packet destined for the subscriber station 310, two (2) packets destined for the subscriber station 320, and three (3) packets destined for the subscriber station 330, the base station 350 performs the downlink scheduling in a priority order of the subscriber station 310, subscriber station 320, and subscriber station 330 according to the SJF algorithm.

Also, assuming that the base station 350 has three (3) packets destined for the subscriber station 310, one (1) packet destined for the subscriber station 320, and the other two (2) packets destined for the subscriber station 330, the base station 350 performs the downlink scheduling in a priority order of the subscriber station 320, the subscriber station 330, and the subscriber station 310 according to the SJF algorithm.

In a case where the subscriber stations are required to be scheduled in the downlink and uplink, the base station 350 performs the downlink and uplink scheduling in a single frame, thereby reducing the transmission power. The scheduling priority is determined by equation (2).

$$\text{MOB\_WEIGHT}(J) = (\text{DL\_WEIGHT} \times \text{WEIGHT}(I)\_\text{DL}) + \quad (2)$$
$$(\text{UL\_WEIGHT} \times \text{WEIGH}(I)\_\text{UL}),$$

where MOB_WEIGHT(J) denotes the weight of the $J^{th}$ subscriber station, DL_WEIGHT denotes the downlink weight, UL_WEIGHT denotes the uplink weight, WEIGHT(I)_DL denotes the $I^{th}$ downlink scheduling weight, and WEIGHT(I)_UL denotes the $I^{th}$ uplink scheduling weight.

If it is assumed that DL_WEIGHT is five (5) and UL_WEIGHT is five (5), the uplink-downlink ratio becomes five to five (5:5).

According to the SJF algorithm, the subscriber station having the first priority is represented by WEIGHT(1)_DL/ WEIGHT(1)_UL. Referring to the above exemplary case, the subscriber stations 310, 320 and 330 have the respective downlink weights WEIGHT(1)_DL, WEIGHT(2)_DL, and WEIGHT(3)_DL. The subscriber stations 310, 320 and 330 also have the respective uplink weights WEIGHT(3)_UL, WEIGHT(1)_UL, and WEIGHT(2)_UL.

If the uplink and downlink weights are determined as WEIGHT(1)_DL, WEIGHT(2)_DL, WEIGHT(3)_DL, WEIGHT(3)_UL, WEIGHT(1)_UL, and WEIGHT(2)_UL, the scheduling priorities of the subscriber stations are determined as following:

MOB_WEIGHT(1) of subscriber station 310=5*3+5*1=20

MOB_WEIGHT(2) of subscriber station 320=5*2+5*3=25

MOB_WEIGHT(3) of subscriber station 330=5*1+5*2=15

Accordingly, the base station 350 performs scheduling in the order of the subscriber station 320, the subscriber station 310, and the subscriber station 330.

That is, the base station 350 allocates the burst regions of the subscriber station 320 and then allocates the burst regions of the subscriber stations 310 and 330 sequentially in the downlink and uplink subframes. At this time, each frame allows for the allocation of one burst region for a subscriber station in each of the downlink and uplink subframes.

As described above, the scheduling method according to this embodiment improves the throughput of the entire system and the power conservation of the subscriber stations. Frame formats for use in the BWA system according to an exemplary embodiment of the present invention are described hereinafter.

Figure 4:
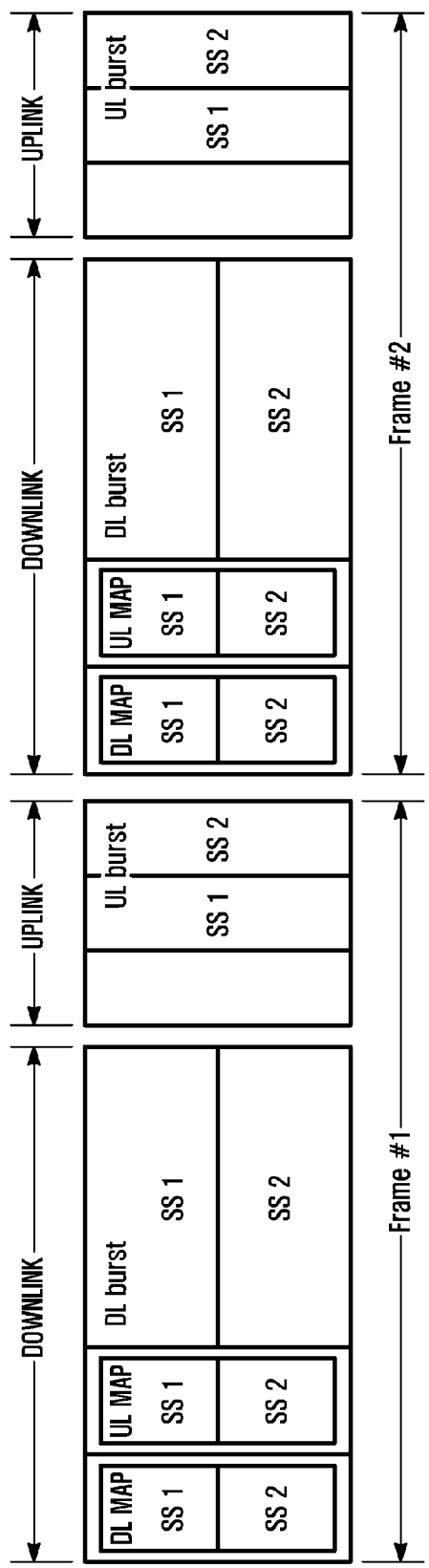
FIG. 4 is a diagram illustrating a frame format of a BWA system according to an exemplary embodiment of the present invention.
Figure 5:
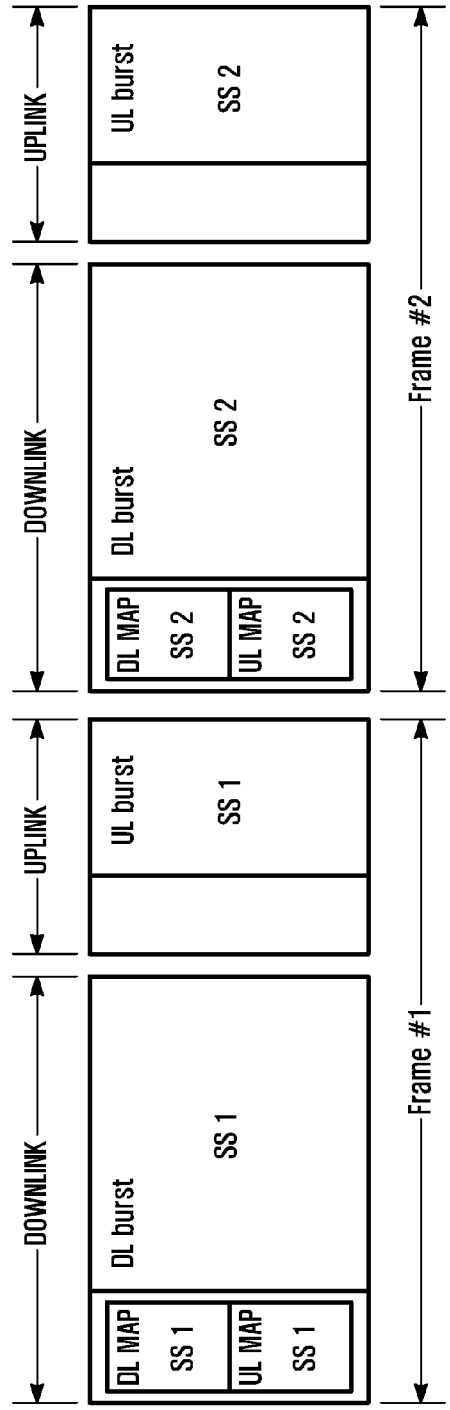
FIG. 5 is a diagram illustrating a frame format of a BWA system according to another exemplary embodiment of the present invention.

FIG. 4 is a diagram illustrating a frame format of a BWA system according to an exemplary embodiment of the present invention, and FIG. 5 is a diagram illustrating a frame format of a BWA system according to another exemplary embodiment of the present invention. In FIGS. 4 and 5, the frame formats are depicted under the assumption that two subscriber stations SS1 and SS2 are receiving data from a base station.

Referring to FIG. 4, the base station allocates the DL bursts to the corresponding subscriber stations (SS1 and SS2) such that SS1 and SS2 receive the data bursts respectively. That is, SS1 and SS2 receive the data from the base station through the DL bursts allocated in every frame.

In FIG. 4, each frame includes a DL-MAP and a UL-MAP, and each MAP contains information on the subscriber stations (for example, MAP IE1 and MAP IE2).

Unlike the frame format of FIG. 4, each frame of FIG. 5 includes MAP information and a data region allocated to a signal subscriber station. In FIG. 5, the first frame (Frame #1) is composed of UL and DL MAPs and a DL burst for the SS1, and the second frame (Frame #2) is composed of a UL and DL MAPs and a DL burst for SS2. In this case, Frame #1 has no DL resource allocated for SS2, and SS2 has no need to operate for receiving Frame #1. Also, Frame #1 has no UL resource allocated for SS2, and SS2 has no uplink data to be transmitted. Accordingly, SS2 turns off the radio frequency power during the first frame interval to minimize energy consumption.

Since the resources of the UL and DL subframes of Frame #1 are dedicatedly allocated for SS1 and the resources of the UL and DL subframes of Frame #2 are dedicatedly allocated for SS2, the UL and DL MAPs of each frame contain the MAP IEs of a single subscriber station, whereby the size of each MAP decreases (by as much as ½). By adopting this resource allocation scheme, MAP overhead can be dramatically reduced.

The frame structure of the BWA system according to an exemplary embodiment of the present invention has been described. A scheduling method for the BWA system using the above structured frame format is described hereinafter with reference to FIG. 6.

Figure 6:
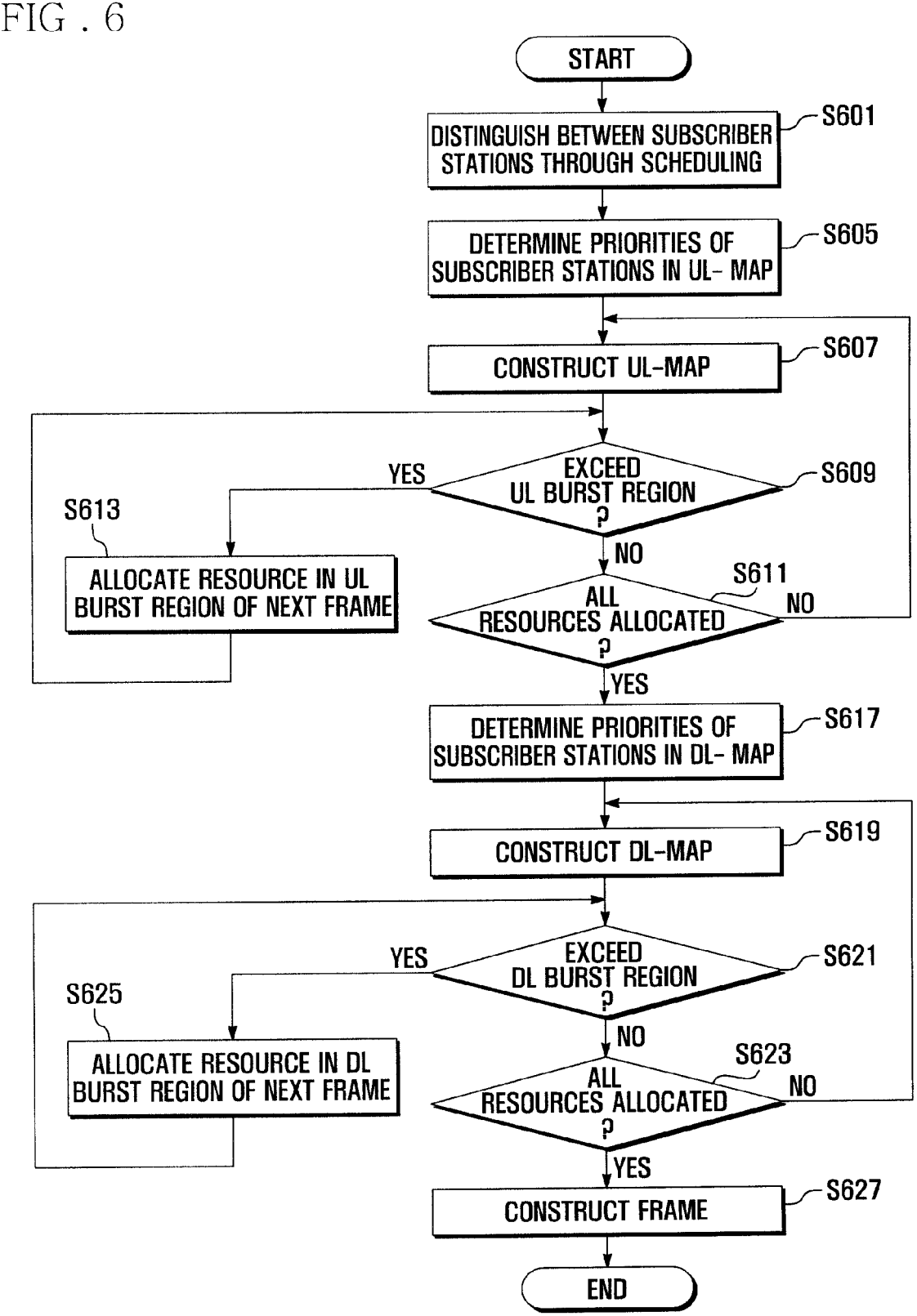
FIG. 6 is a flowchart illustrating a scheduling method for a BWA system according to an exemplary embodiment of the present invention.

FIG. 6 is a flowchart illustrating a scheduling method for a BWA system according to an exemplary embodiment of the present invention.

Referring to FIG. 6, a base station registers subscriber stations located within its coverage area and distinguishes the subscriber stations in association with the transmission directions through a scheduling process in step S601. That is, the base station classifies the subscriber stations that are supposed to receive downlink transmission data and the subscriber stations having uplink transmission data. Next, the base station constructs MAPs using the SJF algorithm. At this time, the base station constructs MAPs in an order of priority beginning with the subscriber station having the least transmission data, i.e. the subscriber station requiring the smallest burst region. The MAP construction process is described in more detail hereinafter.

In the case of UL-MAP construction, the base station determines the priorities of the subscriber stations to which the resources are allocated in step S605 and starts constructing the UL-MAP on the basis of the priorities of the subscriber station in step S607.

During the UL-MAP construction procedure, the base station performs construction of the UL-MAP in an order of priority from the subscriber station requiring the least resources to the subscriber station requiring the most resources. Since the UL burst region is established at the system design stage, the number of subscriber stations of which UL-MAP IEs are added to the UL-MAP is restricted to the size of the UL burst region. Through the following steps 609 to 613, the UL-MAP is constructed with the UL-MAP IEs until the UL burst region is fully allocated. Since the burst region is allocated in the order with the least amount of bursts, the amount of transmission data decreases while the number of UL-MAP IEs increases, whereby data is effectively delivered to the respective subscriber stations. In contrast, if the burst region is allocated in the order with the most amount of bursts first, the number of UL-MAP IEs constituting the UL-MAP decreases.

The base station allocates the resources to the subscriber stations in the range of the UL burst region having a given size. In a case where the resources of the UL burst region are running short as determined in step S609, the base station may allocate the resources of the next frame in step S613. The resource allocation process is repeatedly performed until all of the subscriber stations that are supposed to transmit data are assigned the resources as illustrated in step S611. The SJF algorithm is then performed in step S615

After completing the UL resource allocation, the base station starts construction of the DL-MAP. The base station determines the priorities of the subscriber stations that are supposed to receive the downlink data in step S617 and constructs the DL-MAP in an order of priority in step S619.

The base station constructs the DL-MAP in an order of priority from the subscriber station that is supposed to receive the least amount of DL data to the subscriber station supposed to receive the most amount of DL data. The size of the DL burst region is determined, depending on the size of the DL-MAP. Accordingly, the DL-MAP is constructed by adding the DL-MAP IEs using the SJF algorithm before the DL burst exceeds the maximum DL burst region. As described above, if the UL-MAP is constructed in an order of priority from the subscriber station requiring the least amount of resources to the subscriber station requiring the most amount of resources, the size of DL-MAP increases such that the amount of the transmission data decreases. However, more subscriber stations can be served simultaneously. In contrast, if the DL burst region is allocated in the order with the most amount of bursts first, the number of DL-MAP IEs constituting the DL-MAP decreases.

The base station allocates the resources to the subscriber stations in the range of the DL burst region having a given size through steps S621 to S625. If the resources of the DL burst region run short during the resource allocation as determined in step S621, the base station may allocate the resources of the next frame in step S625. The downlink resource allocation process is repeatedly performed until all of the subscriber stations that are supposed to receive the data are assigned the resources as illustrated in step S623.

After completing the DL resource allocation, the base station starts constructing the frame in step S627. As described in the above example, the first subscriber station SS1 is assigned the first frame, and the second subscriber station SS2 is assigned the second frame such that the uplink and downlink regions of each frame are allocated to one subscriber station. In a case where the amount of data of the first subscriber station SS1 is greater than the maximum burst region, the base station may assign two continuous frames to the first subscriber station SS1 and the following frame to the second subscriber station SS2. In this case, each frame has the uplink and down burst regions dedicated to a signal subscriber station. In a case where one of the subscriber stations requires one of uplink and downlink transmissions, the base station may assign the uplink and downlink burst regions as a single resource or assign the other burst region to another subscriber station in order to avoid wasting resources.

As described above, the scheduling method for a BWA system according to exemplary embodiments of the present invention improves the throughput of the entire system and improves power conservation of the subscriber stations.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

As described above, the scheduling method for a BWA system according to the present invention constructs MAPs of a frame adaptively to the communication environment so as to minimize the MAP overhead regardless of a variation of the communication environment, thereby improving throughput of the entire system and increasing energy conservation.

What is claimed is:

1. A scheduling method for a broadband wireless access system, comprising:
    selecting a terminal having a highest priority using a scheduling algorithm;
    determining a burst region to be assigned to the terminal; and
    constructing a frame intended for the terminal according to the determination,
    wherein the frame comprises an Uplink (UL) MAP and a Downlink (DL) MAP, wherein the size of the UL MAP and DL MAP corresponds to a number of terminals the frame is intended for.

2. The scheduling method of claim 1, wherein the selecting of the terminal comprises calculating priorities of multiple terminals in an order based on a size of burst regions required by the terminals with the terminal requiring the smallest burst region being the highest in priority.

3. The scheduling method of claim 2, wherein the scheduling algorithm comprises a Shortest Job First (SJF) algorithm.

4. The scheduling method of claim 1, wherein the determining of the burst region comprises determining the burst region in a given UL region and a given DL region.

5. The scheduling method of claim 1, wherein the frame comprises an UL allocation region and a DL allocation region of the terminal.

6. The scheduling method of claim 4, wherein the frame comprises at least one MAP containing information on a number of continuous frames that are not carrying data intended for the terminal.

7. The scheduling method of claim 1, wherein the selecting of the terminal comprises calculating priorities of multiple terminals according to an equation:

$$MOB\_WEIGHT(J) = (DL\_WEIGHT \times WEIGHT(I)\_DL) + (UL\_WEIGHT \times WEIGH(I)\_UL),$$

where $MOB\_WEIGHT(J)$ denotes a weight of a $J^{th}$ subscriber station, $DL\_WEIGHT$ denotes a DL weight, $UL\_WEIGHT$ denotes a UL weight, $WEIGHT(I)\_DL$ denotes an $I^{th}$ DL scheduling weight, and $WEIGHT(I)\_UL$ denotes an $I^{th}$ UL scheduling weight.

* * * * *